United States Patent
Casset et al.

(10) Patent No.: US 11,474,607 B2
(45) Date of Patent: Oct. 18, 2022

(54) VIRTUAL, AUGMENTED, OR MIXED REALITY DEVICE

(71) Applicant: Commissariat à l'Énergie Atomique et aux Énergies Alternatives, Paris (FR)

(72) Inventors: Fabrice Casset, Grenoble (FR); Stéphane Fanget, Grenoble (FR); Angélique Rascle, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 16/783,023

(22) Filed: Feb. 5, 2020

(65) Prior Publication Data
US 2020/0257366 A1   Aug. 13, 2020

(30) Foreign Application Priority Data
Feb. 8, 2019 (FR) .................................. 1901269

(51) Int. Cl.
*G06F 3/01* (2006.01)
*B06B 1/06* (2006.01)
(Continued)

(52) U.S. Cl.
CPC ............ *G06F 3/016* (2013.01); *B06B 1/0622* (2013.01); *G02B 27/0172* (2013.01);
(Continued)

(58) Field of Classification Search
CPC .......... G06F 3/016; G06F 3/017; G06F 3/011; G06F 3/043; G06F 3/0414; B06B 1/0622;
(Continued)

(56) References Cited

U.S. PATENT DOCUMENTS

2015/0323993 A1\*  11/2015  Levesque ........... G02B 27/0172
                                                  345/156
2016/0193976 A1\*   7/2016  Wild .................... B60N 2/0228
                                                   701/36
(Continued)

FOREIGN PATENT DOCUMENTS

CN       107908000       * 11/2017
CN       107908000 A       4/2018
(Continued)

OTHER PUBLICATIONS

FR1901269, Oct. 8, 2019, Preliminary Search Report.
Preliminary Search Report for French Application No. 1901269, dated Oct. 8, 2019.

*Primary Examiner* — Omar Casillashernandez
(74) *Attorney, Agent, or Firm* — Wolf, Greenfield & Sacks, P.C.

(57) ABSTRACT

A portable virtual, augmented, or mixed reality device, including: a mount intended to be worn on a user's head; a display screen attached to the mount and intended to be arranged in front of one of the user's eyes; a plurality of ultrasound transducers attached to the mount; and a control circuit configured to control the display screen to display images, and the ultrasound transducers to generate, in air, at a distance from the mount, a pressure distribution detectable by the user's hand to obtain a haptic effect.

11 Claims, 2 Drawing Sheets

(51) Int. Cl.
    *G02B 27/01*     (2006.01)
    *G06T 19/00*     (2011.01)
    *G06V 20/20*     (2022.01)

(52) U.S. Cl.
    CPC ............ *G06F 3/017* (2013.01); *G06T 19/006* (2013.01); *G06V 20/20* (2022.01); *G06T 2215/16* (2013.01)

(58) Field of Classification Search
    CPC .............. G02B 27/0172; G02B 27/017; G02B 2027/0178; G06K 9/00671; G06T 19/006; G06T 2215/16
    USPC ...................................................... 340/407.1
    See application file for complete search history.

(56) References Cited

U.S. PATENT DOCUMENTS

2017/0216887 A1\*   8/2017   Song ..................... B06B 1/0644
2020/0387227 A1\*  12/2020   Erivantcev .............. G06F 3/011

FOREIGN PATENT DOCUMENTS

EP         2 945 044 A1    11/2015
EP           2945044     \* 11/2015

\* cited by examiner

VIRTUAL, AUGMENTED, OR MIXED REALITY DEVICE

This application claims the priority benefit of French patent application number 19/01269, filed on Feb. 8, 2019, the contents of which is hereby incorporated by reference in its entirety to the maximum extent allowable by law.

TECHNICAL BACKGROUND

The present disclosure concerns a virtual, augmented, or mixed reality device.

PRIOR ART

Portable virtual, augmented, or mixed reality display devices of glass or mask type have already been provided, comprising a mount intended to be worn on a user's head and a display screen attached to the mount intended to be placed in front of at least one of the user's eyes, typically a few centimeters away from the user's eye. The screen enables the user to display visible images. The screen may be opaque. It is then spoken of a virtual reality display device since, from the user's viewpoint, the images displayed on the screen replace the real scene located in the user's visual field. As a variation, the screen may be partially transparent. It is then spoken of an augmented reality display device or also of a mixed reality device since, from the user's viewpoint, the images displayed on the screen are overlaid to and/or are in correlation with the real scene located in the user's visual field.

User interface devices called haptic interface devices, enabling to create, for the user, the feeling of touching a virtual object, have further already been provided. A haptic interface device comprising an array of ultrasound transducers individually controllable to generate ultrasound pulses has already been provided. A control circuit controls the transducers in transmit mode with phase shifts between the different transducers selected to focus the waves emitted at a selected point in space, at a distance from the transducer array. This enables to generate, in the vicinity of the selected focusing point, a sufficiently high pressure to be felt by the user when the latter places his/her hand at the level of the target point. Different focusing points may be successively scanned at a relatively high speed to generate in space a pressure distribution perceptible by the user, enabling to create the feeling of touching a virtual object.

Systems combining display devices in virtual, augmented, or mixed reality and haptic interface devices have already been provided.

A system combining a glass or mask type portable display device in virtual, augmented, or mixed reality, with a haptic interface device based on ultrasound transducers of the above-described type, has in particular been provided. This enables to provide the user at the same time with an optical image and the feeling of touching a virtual object. However, a limitation of such a system is that known haptic interface devices based on ultrasound transducers are fixed (non-portable) devices. Thus, to benefit from haptic sensations, the user has to place his/her hand in a predefined fixed volume, corresponding to the set of focusing points accessible by the array of ultrasound transducers.

SUMMARY

There is a need for a virtual, augmented, or mixed reality device overcoming all or part of the disadvantages of known devices.

In particular, there is a need for a portable virtual, augmented, or mixed device, combining an optical vision and haptic sensations.

Thus, an embodiment provides a portable virtual, augmented, or mixed reality device, comprising:

a mount intended to be worn on a user's head;

a display screen attached to the mount and intended to be arranged in front of one of the user's eyes;

a plurality of ultrasound transducers attached to the mount; and a control circuit configured to control the display screen to display images, and the ultrasound transducers to generate, in air, at a distance from the mount, a pressure distribution detectable by the user's hand to obtain a haptic effect.

According to an embodiment, the device further comprises a system for detecting the position of the user's hand.

According to an embodiment, the control circuit is configured to read output data of the detection system and accordingly modify the control of the display screen and of the ultrasound transducers.

According to an embodiment, the detection system comprises a camera or an infrared emission/reception system.

According to an embodiment, the detection system comprises one or a plurality of ultrasound transducers from said plurality of ultrasound transducers.

According to an embodiment, the ultrasound transducers are piezoelectric transducers.

According to an embodiment, each transducer comprises a flexible membrane suspended on a rigid support, and a piezoelectric conversion element bonded to the flexible membrane.

According to an embodiment, each ultrasound transducer is arranged in a cavity formed in the mount.

According to an embodiment, the device further comprises, between each transducer and the user's face, an element made of a material absorbing for the ultrasound waves emitted by the transducer.

According to an embodiment, the control circuit is configured to control the emission of ultrasound pulses by the transducers with phase shifts between the different transducers selected to focus the emitted waves on a selection point in space.

The foregoing and other features and advantages will be discussed in detail in the following non-limiting description of specific embodiments in connection with the accompanying drawings.

DESCRIPTION OF THE EMBODIMENTS

Figure 1:
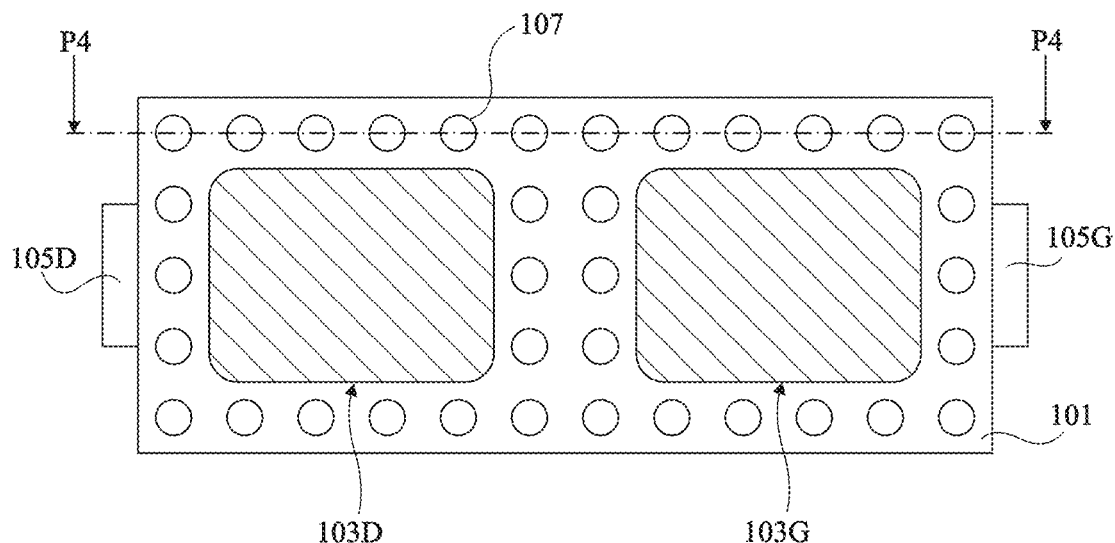
FIG. 1 is a simplified front view of an example of a virtual, augmented, or mixed reality device according to an embodiment.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the uses that can be made of the described devices have not been detailed, the described embodiments being compatible with all known applications of virtual, augmented, or mixed reality capable of taking advantage of a portable device combining an optical vision and haptic sensations. Further, the forming of the different elements forming the described devices has not been detailed, the forming of these elements being within the abilities of those skilled in the art based on the indications of the present disclosure.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", "lateral", etc., it is referred to the orientation of the drawings, it being understood that, in practice, the described photodetectors may be oriented differently.

The terms "about", "approximately", "substantially", and "in the order of" are used herein to designate a tolerance of plus or minus 10%, preferably of plus or minus 5%, of the value in question.

FIG. 1 is a simplified front view of an example of a virtual, augmented, or mixed reality device 100 according to an embodiment.

The device 100 of FIG. 1 is a glass-type device, intended to be worn on a user's head (not shown). Device 100 comprises a mount 101 having two display screens 103G and 103D intended to be respectively positioned in front of the user's left eye and in front of the user's right eye attached thereto, for example, at a distance in the range from 0.5 to 10 centimeters respectively from the user's left eye and from the user's right eye. Device 100 further comprises branches 105G and 105D attached to the mount edges respectively on the side of screen 103G and on the side of screen 103D, enabling to hold the device in place on the user's head.

Device 100 may be a virtual reality device. In this case, display screens 103G and 103D are blocking or opaque, blocking the transmission to the user's eyes of visible light rays originating from the real scene located in front of the user. The user then only sees the images displayed by screens 103G and 103D.

As a variation, device 100 may be an augmented or mixed reality device. In this case, display screens 103G and 103D are partially transparent, transmitting to the user's eyes all or part of the visible light rays originating from the real scene located in front of the user. The user then sees images displayed by screens 103G and 103D overlaid to the real scene located in his/her visual field.

According to an aspect of an embodiment, device 100 further comprises a plurality of ultrasound transducers 107 attached to mount 101. The transducers 107 are for example all identical or similar. In the shown example, transducers 107 are regularly distributed all around the display screens 103G and 103D of the device. The described embodiment are however not limited to this specific layout of transducers 107. As a variation, transducers 107 may be arranged in an array under or above display screens 103G and 103D, between display screens 103G and 103D, or also to the left or to the right of display screens 103G and 103D. Transducers 107 are individually controllable to generate ultrasound pulses which cannot be heard by the user, for example, having a frequency in the range from 20 kHz to 1 MHz.

Device 100 further comprises an electronic control circuit, not shown in FIG. 1, configured to control the emission of ultrasound pulses by transducers 107, with phase shifts between the different selected transducers to focus the emitted waves on a selected point in space located in front of the user, at a distance from mount 101, for example, within reach of the user's hand or foot, for example, at a distance in the range from 0.1 to 2 meters away from mount 101. This enables to generate, in the vicinity of the selected focusing point, a sufficiently high pressure to be felt by the user when the latter places his/her hand at the level of the target point. Different focusing points may be successively scanned at a relatively high speed to generate in space a pressure distribution perceptible by the user, enabling to create a feeling of touching a virtual object.

The control circuit is further configured to control the display of images on screens 103G and 103D.

This enables to provide the user at the same time with an optical image, for example two-dimensional or three-dimensional, and the feeling of touching a virtual object.

An advantage of device 100 lies in its compactness and in its portability, due to the fact that ultrasound transducers 107 are attached to the same portable mount 101 as display screens 103G and 103D. Thus, the vision and the feeling of touching virtual objects are permitted whatever the place where the device is used. In other words, it is not necessary to previously define a fixed area where a haptic effect may be obtained. This results in a greater immersion of the user in the virtual environment.

Another advantage of device 100 is linked to the fact that display screens 103G and 103D and ultrasound transducers 107 are attached to a same mount 101 and are thus rigidly fastened. In other words, the relative position of ultrasound transducers 107 with respect to display screen 103G and 103D is fixed. As a result, the alignment between the optical virtual objects displayed by screens 103G and 103D and the haptic virtual objects generated by ultrasound transducers 107 is relatively easy to perform.

Another advantage is linked to the fact that, since ultrasound transducers 107 are worn by the user himself, the distance between transducers 107 and the area for generating the haptic virtual objects may be relatively short. This enables to limit the required ultrasound emission power and thus the electric power consumption associated with the generation of the haptic effect.

Device 100 may further comprise a detection system, not shown in FIG. 1, capable of detecting elements of the environment. As an example, the detection system is configured to detect the position of the user's hand to detect possible interactions of the user with virtual objects generated by the device and accordingly modify the generated virtual objects and/or haptic effects.

The detection system may comprise a camera, an infrared emission/reception detection device, or any other adapted detection device, attached to mount 101 or to branches 105G, 105D of the device.

In a preferred embodiment, the detection system uses one or a plurality of ultrasound transducers 107 to detect elements of the environment. As an example, during a detection phase, certain ultrasound transducers 107 may be controlled to generate an acoustic signal capable of reflecting on the user's hands, and other transducers may be activated in receive mode to read the reflected acoustic signal. Thus, the user's hand may be located and imaged by the device. The transducers used for the detection may be the same as those used for the generation of the haptic effect. In this case, the phases of detection and the phases of generation of a haptic effect may be sequential. As a variation, certain transducers 107 may be dedicated to the detection of the environment and other transducers 107 may be dedicated to the generation of haptic effects, in which case the phases of detection and the phases of generation of virtual objects may be simultaneous.

Figure 2:
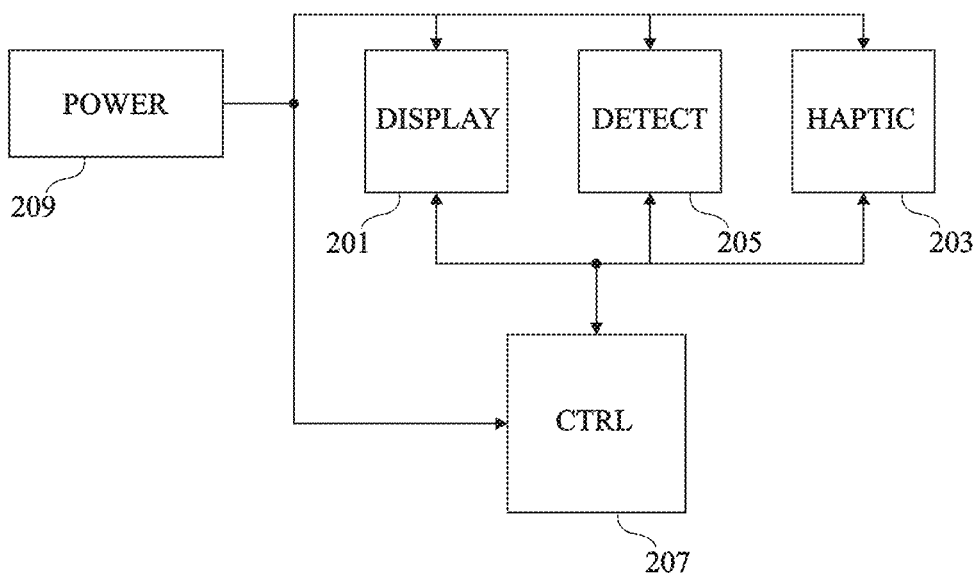
FIG. 2 is a simplified diagram illustrating, in the form of functional blocks, an example of a virtual, augmented, or mixed reality device according to an embodiment.

FIG. 2 is a diagram illustrating, in the form of functional blocks, an example of a virtual, augmented, or mixed reality device according to an embodiment.

The virtual, augmented, or mixed reality device of FIG. 2 comprises an image display device 201 (DISPLAY) for example comprising screens 103G and 103D of device 100 of FIG. 1. Device 201 may comprise one or a plurality of matrix micro-displays, one or a plurality of scanning micro-projectors, or any other device capable of displaying an image on a screen placed a few centimeters away from one of the user's eyes.

The virtual, augmented, or mixed reality device of FIG. 2 further comprises a haptic virtual object generation device 203 (HAPTIC), for example comprising the assembly of transducers 107 of device 100 of FIG. 1.

In the shown example, the virtual, augmented, or mixed reality device of FIG. 2 further comprises a device for detecting elements of the environment 205 (DETECT). Device 205 for example comprises a camera, an infrared emission/reception detection device, or ultrasound transducers.

The virtual, augmented, or mixed reality device of FIG. 2 further comprises a control circuit 207 (CTRL) capable of receiving information from detection device 205 and of accordingly controlling image display device 201 and haptic virtual object generation device 203. Control circuit 207 may comprise a microprocessor. Control circuit 207 may be attached to mount 101 or to the branches 105G, 105D of the device 100 of FIG. 1. As a variation, control circuit 207 may form part of an offset device, for example, of smart phone type, capable of remotely communicating, for example, by radio communication, with devices 201, 203, and 205.

The virtual, augmented, or mixed reality device of FIG. 2 further comprises a power supply device 209 (POWER) capable of comprising a battery. Device 209 is capable of delivering the electric power for supplying the different blocks of the virtual, augmented, or mixed reality device, and particularly in devices 201, 203, 205, and 207. As an example, in the device 100 of FIG. 1, a battery of power supply device 209 may be attached to mount 101 or to the branches 105G, 105D of the device 100 of FIG. 1.

Figure 3:
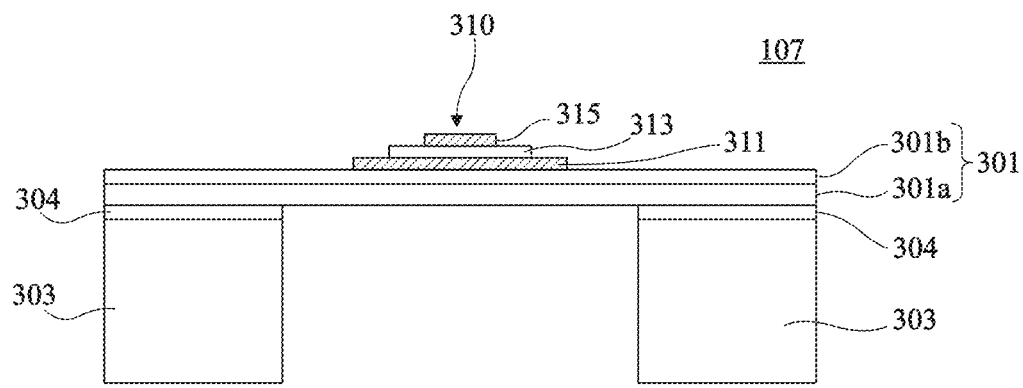
FIG. 3 is a partial simplified cross-section view illustrating an embodiment of an ultrasound transducer of the device of FIG. 1.

FIG. 3 is a partial simplified cross-section view illustrating an embodiment of an ultrasound transducer 107 of the device of FIG. 1.

In this example, transducer 107 is a membrane transducer of PMUT ("Piezoelectric Micromachined Ultrasonic Transducer") type. It comprises a flexible membrane 301 suspended by its periphery to a rigid support 303. Support 303 is for example made of silicon.

As an example, support 303 is formed of a continuous frame or of a plurality of separate pillars. In a peripheral portion of membrane 301, membrane 301 is bonded, by its lower surface, to the upper surface of support 303. In the shown example, an insulating layer 304, for example, made of silicon oxide, forms an interface between the upper surface of support 303 and the lower surface of membrane 301 in the regions of bonding of membrane 301 to support 303. A central portion of membrane 301 is free to move with respect to support 303, in a direction substantially orthogonal to the plane of the membrane.

Membrane 301 may be monolayer or multilayer. The total thickness of the membrane is for example in the range from 2 to 20 µm. In the shown example, membrane 301 comprises two stacked layers 301a and 301b. Lower layer 301a is for example made of polysilicon. Layer 301a for example has a thickness in the range from 2 to 8 µm, for example, in the order of 4 µm. Upper layer 301b is for example made of silicon oxide. Layer 301b for example has a thickness in the range from 0.5 to 3 µm, for example, in the order of 1.9 µm. In top view, the general shape of the membrane may be rectangular, for example, square, or circular. The dimensions of membrane 301 is top view may be relatively large, for example, in the order of a few millimeters. As an example, membrane 301 has, in top view, a maximum dimension (diameter, width or length) in the range from 1 to 15 millimeters.

The transducer 107 of FIG. 3 further comprises a piezoelectric conversion element 310 bonded to membrane 301, on the upper surface side of membrane 301 in the shown example. In this example, piezoelectric conversion element 310 comprises a lower electrode 311 arranged on top of and in contact with the upper surface of membrane 301, a layer 313 made of a piezoelectric material arranged on top of and in contact with the upper surface of electrode 311, and an upper electrode 315 arranged on top of and in contact with the upper surface of piezoelectric layer 313.

Piezoelectric layer 313 may be made of lead zirconium titanium (PZT), of aluminum nitride (AlN), of zinc oxide (ZnO), or of any other adapted piezoelectric material.

Each of electrodes 311 and 315 may be monolayer or multilayer. As an example, lower electrode 311 comprises a platinum layer in contact with the lower surface of layer 313, and upper electrode 315 comprises a stack (not detailed in the drawing) of a ruthenium layer in contact with the upper surface of piezoelectric layer 313 and of a gold layer in contact with the upper surface of the ruthenium layer.

The application of a voltage between electrodes 311 and 315 generates an electric field in piezoelectric layer 313, causing a mechanical deformation of layer 313 (stretching or contraction according to the polarity of the applied voltage), and thus a deformation of membrane 301. Such an electromechanical transduction effect may be used to generate an ultrasound acoustic wave.

Conversely, the application of a mechanical deformation to piezoelectric layer 313 causes a variation in the electric field, and thus a charge storage in electrodes 311 and 313 of the piezoelectric conversion element. Such a mechanical-electrical transduction effect may be used to measure an ultrasound signal received by the transducer.

Although, in the example of FIG. 3, piezoelectric conversion element 301 is located substantially at the center of membrane 301, other layouts may be provided. As a variation, the piezoelectric conversion element may be located in a peripheral portion of the membrane. In another variation, the transducer may comprise a plurality of piezoelectric conversion elements bonded to the membrane. As an example, the transducer may comprise two piezoelectric conversion elements respectively arranged in a central portion and in a peripheral portion of the membrane.

Figure 4:
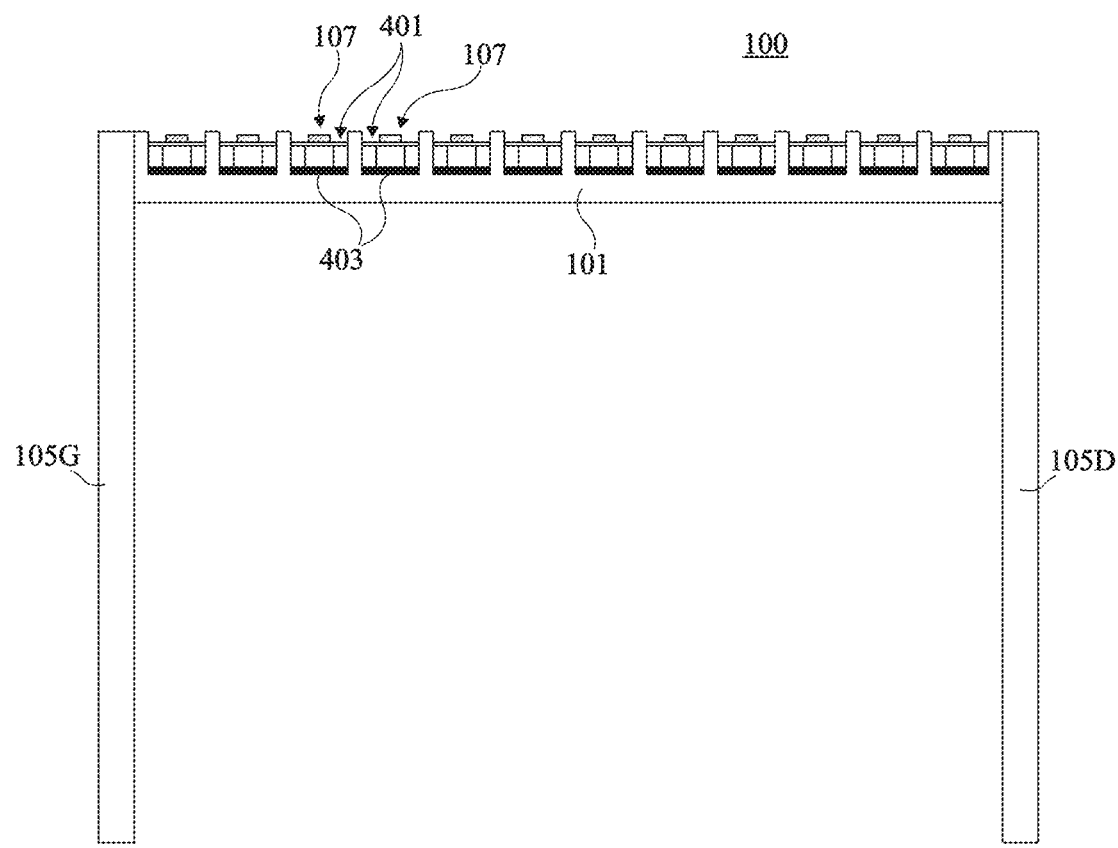
FIG. 4 is a simplified cross-section view illustrating an example of integration of ultrasound transducers in the device of FIG. 1.

FIG. 4 is a simplified cross-section view of the device 100 of FIG. 1 along plane P4 of FIG. 1, illustrating an example of integration of ultrasound transducers 107 in device 100.

In the example of FIG. 4, transducers 107 are located in cavities 401 formed in mount 101, all around screens 103G, 103D. As an example, each transducer 107 forms an individual chip. The device for example comprises one cavity 401 per transducer, and a single transducer per cavity. The described embodiments are however not limited to this specific case. In the shown example, each transducer 107 has its membrane facing the opening of cavity 401 where it is arranged. As a variation, the transducers may have their membranes facing the bottom of the cavities, the ultrasound waves being then emitted from the rear side of each membrane.

To avoid for the pressure waves perceptible by the user to be transmitted towards his/her face, an element 403 made of a material absorbing for the waves emitted by transducers 107 may be placed between each transducer 107 and the user's face, for example, at the bottom of each of cavities 401. As an example, each element 403 is capable of absorbing at least half of the ultrasound power emitted towards the user's face by the transducer 107 facing it.

The connections of transducers 107 to control circuit 207 (FIG. 2) and to power supply block 209 (FIG. 2) may be performed by wires or conductive tracks arranged on the front surface side of the transducers (that is, the surface opposite to the user's face). As a variation, the connections to electrodes 311 and 315 (FIG. 3) of transducers 107 may be transferred to the rear side of the transducers by means of conductive vias (not shown in the drawings) crossing support 303 (FIG. 3).

Various embodiments and variations have been described. It will be understood by those skilled in the art that certain features of these various embodiments and variations may be combined, and other variations will occur to those skilled in the art. In particular, the described embodiments are not limited to glass type virtual, augmented, or mixed reality devices such as described in FIGS. 1 and 4, but may more generally apply to any portable virtual, augmented, or mixed reality device intended to be worn on a user's head, for example, a device of mask of headset type. It should in particular be noted that the described embodiments may be applied to devices comprising a number of display screens different from two, for example, a single screen or more than two screens.

Further, the described embodiments are not limited to the embodiment of ultrasound transducers 107 described in relation with FIG. 3. More generally, any other type of known ultrasound transducer, be it piezoelectric or not, may be used.

Further, although, in the above-described examples, the ultrasound transducers 107 are directly attached to mount 101, the described embodiments are not limited to this specific case. As a variation, the transducers 107 may be attached to all or part of the outer surface of the display screen(s) of the device. The transducers 107 are then indirectly attached to mount 101. For example, in the case of a virtual reality device, ultrasound transducers 107 may be attached to the entire outer surface (that is, the surface opposite to the user's eyes) of the display screen. In the case of a mixed or augmented reality device, that is, comprising one or a plurality of transparent display screens, for example, made of glass, enabling the user not only to see the virtual images generated by the control circuit, but also to view a real scene through the screen, the transducers may be directly integrated in the screen (for example, in cavities formed in the screen glass). The transducers may be arranged in a peripheral portion of the screen to avoid hindering the vision of the outer scene. As a variation, the transducers may be made of transparent materials (support 303 may for example be made of quartz or of glass), in which case the transducers may be placed on substantially the entire surface of the screen.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A portable virtual, augmented, or mixed reality device, comprising:
   a mount configured to be worn on a head of a user;
   a display screen attached to the mount and configured to be arranged in front of an eye of the user;
   a plurality of ultrasound transducers attached to the mount;
   a detection system configured to use one or more of the ultrasound transducers to emit ultrasound waves to an environment in front of the user when the mount is worn by the user, to detect a location of a hand of the user in the environment in front of the user; and
   a control circuit configured to control the display screen to display images, and to control at least one of the ultrasound transducers to generate, in air, at the location of the hand detected by the detection system, a haptic effect via a pressure distribution detectable by the hand at the location of the hand detected by the detection system,
   wherein the detection system detects the location of the hand of the user in a first phase, and the control circuit generates the haptic effect in a second phase after the location of the hand has been detected by the detection system.

2. The device of claim 1, wherein the control circuit is configured to read output data of the detection system and accordingly modify the control of the display screen and the control of the ultrasound transducers.

3. The device of claim 1, wherein the ultrasound transducers are piezoelectric transducers.

4. The device of claim 3, wherein each of the ultrasound transducers comprises:
   a flexible membrane suspended on a rigid support, and
   a piezoelectric conversion element bonded to the flexible membrane.

5. The device of claim 1, wherein each of the ultrasound transducers is arranged in a cavity formed in the mount.

6. The device of claim 1, further comprising, between the ultrasound transducers and a face of the user when the mount is worn by the user, an element made of a material for absorbing the ultrasound waves emitted by the ultrasound transducers.

7. The device of claim 1, wherein the control circuit is configured to control an emission of ultrasound pulses by the ultrasound transducers with phase shifts between different selected ones of the ultrasound transducers to focus waves of the emitted ultrasound pulses on a selected point in space.

8. The device of claim 1, wherein the one or more ultrasound transducers used by the detection system to detect the location of the hand of the user are different from the at last one of the ultrasound transducers controlled by the control circuit to generate the haptic effect.

9. The device of claim 8, wherein the one or more ultrasound transducers used by the detection system operate simultaneously with the at last one of the ultrasound transducers controlled by the control circuit to generate the haptic effect.

10. The device of claim 1, wherein the one or more ultrasound transducers used by the detection system to detect the location of the hand of the user are same as the at last one of the ultrasound transducers controlled by the control circuit to generate the haptic effect.

11. The device of claim 10, wherein the one or more ultrasound transducers used by the detection system operate sequentially with the at last one of the ultrasound transducers controlled by the control circuit to generate the haptic effect.

* * * * *